United States Patent
MacNeille

[11] 3,758,201
[45] Sept. 11, 1973

[54] OPTICAL SYSTEM FOR IMPROVED EYE REFRACTION

[75] Inventor: Stephen M. MacNeille, Southborough, Mich.

[73] Assignee: American Optical Corporation, Southbridge, Mass.

[22] Filed: July 15, 1971

[21] Appl. No.: 162,960

[52] U.S. Cl............ 351/25, 350/157, 350/175 DR, 350/184, 351/17, 351/32
[51] Int. Cl...... A61b 3/02, G02b 3/04, G02b 15/16
[58] Field of Search .................. 351/17, 25, 28, 29, 351/32; 350/175 DR, 132, 157, 184

[56] References Cited
UNITED STATES PATENTS

| | | | |
|---|---|---|---|
| 3,240,548 | 3/1966 | Biessels............................ | 351/25 X |
| 3,583,790 | 6/1971 | Baker................................ | 350/184 |
| 3,507,565 | 4/1970 | Alverez et al.................. | 350/184 X |
| 3,507,549 | 4/1970 | Land................................. | 350/132 |
| 2,280,297 | 4/1942 | Neumueller et al. .......... | 350/132 X |

OTHER PUBLICATIONS

W. J. Biessels, "The Simultantest,"The Optician, June 7, 1957, pps. 533–541

W. J. Biessels, "The Cross–Cylinder Simultan Test," J. Amer. Optom. Assoc., Vol. 38, No. 6, June 1967, pp. 473–476

Erwin J. Daniels, "The Zeiss Simultantest," The Optician, vol 156, No. 4034, July 26, 1968, pp. 83–85

*Primary Examiner*—David Schonberg
*Assistant Examiner*—Paul A. Sacher
*Attorney*—William C. Nealon et al.

[57] ABSTRACT

Eye refraction optical system including birefringent and variable power lens means in optical alignment with target structure providing target area to be viewed simultaneously in light of two different groups of polarized light rays, said birefringent and variable power lens means including birefringent means for effecting a slightly different dioptric power for the viewed target area for one of said groups from that of the other and also including movable refractive lens means for changing the effective dioptric power of both target areas simultaneously for choice by patient of image of best focus.

10 Claims, 9 Drawing Figures

INVENTOR.
STEPHEN M. MacNEILLE
ATTORNEY

INVENTOR.
STEPHEN M. MacNEILLE
BY
Noble J. Williams
ATTORNEY

OPTICAL SYSTEM FOR IMPROVED EYE REFRACTION

Conventionally, in refracting a patient, a series of lenses are sequentially placed on the optical axis of the patient viewing a target, such as a refraction chart. Or a series of targets are sequentially placed on the optical axis and the patient attempts to pick the particular lens or target which he or she believes provides the sharpest image. This results in the patient attempting to decide whether the image being shown to him is as sharp as or sharper than the one shown to him or her a few seconds before. Thus, the conventional system attempts to rely upon the patient's memory, and while even though only a few seconds may have elapsed between viewings, the results are less than desirable. Such tests, when repeated, may vary appreciably.

According to the present invention, an eye refraction optical system is provided wherein the patient views two slightly different images of a target simultaneously through doubly refracting lens means, and by also providing variable power lens means in the system, the dioptric power for both images may be changed and the patient may choose between the sharpness of the two different images of the target being presented simultaneously. In such an optical system, the variable power lens means may be arranged to be controlled by the patient, or by the optician or technician conducting the refraction examination, as desired.

It is, therefore, an object of the present invention to provide an eye refraction optical system through which a patient can simultaneously view two different images of a target area of slightly different dioptric power and lens means for changing the power of both image areas simultaneously.

Another object of the invention is to provide an optical system for refracting the eye of a patient wherein two slightly different images of a target area are viewed simultaneously and adjustment of variable power lens means permits the patient to choose between the sharpest of the two images while the dioptric power of both are being changed by substantially like amounts, and wherein said power may selectively include various amounts of both negative and positive power.

A further object of the invention is to provide an optical system for eye refraction which includes one or more birefringent lens elements providing in two different beams of polarized light being received from a target area slightly different optical powers and means for varying the dioptric powers of both beams simulataneously and in a step-by-step or continuously variable fashion as desired.

A further object of the invention is to provide an optical system employing birefringent and variable power lens means whereby the light from a polarizing target area is split into two beams providing two images with somewhat different optical powers and means for varying the powers of both beams simultaneously and by equal amounts while the two images are being viewed.

These and other objects and advantages of the invention will be readily ascertained by referring to the following description and appended drawings in which.

Figure 1:
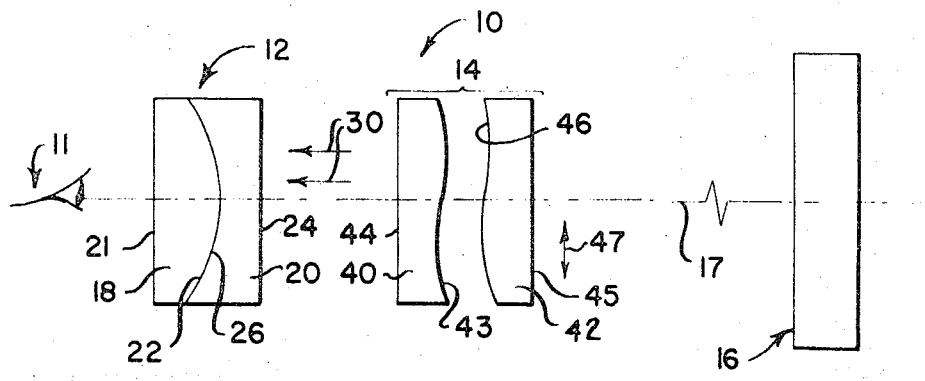
FIG. 1 is a schematic side elevational view of one form of optical system for eye refraction according to the invention.

Referring to the drawings in detail, it will be seen that an improved optical system 10 for eye refraction is shown schematically in FIG. 1 and indicates a patient's eye generally by the numeral 11 positioned for viewing through the optical system. The optical system comprises a birefringent lens assembly 12, a variable power lens assembly 14 and a target assembly 16 in optical alignment. The components 12 and 14 of the system may be mounted in known fashion in a suitable frame or housing or other supporting structure, not shown, and provided with suitable means arranged to position the various elements thereof in optical alignment along an optical axis 17. The optical axis passes centrally through the birefringent assembly 12 of the system and the target assembly 16 which may be in conventional fashion spaced at a suitable working distance from the rest of the apparatus, such as at a distance of 20 feet.

The target assembly which is indicated generally by the numeral 16 in FIG. 1 is preferably of either of two types, a vectographic type or a split-field polarizing type, both of which will be described more fully hereinafter, but here may be described merely as being of such construction as to simultaneously direct two different orthogonally related vibrational components of polarized light from resolution chart means or the like of the target assembly to and through the lens assembly 14 and birefringent assembly 12 as same travel towards the eye position 11.

The birefringent lens assembly 12 of FIG. 1 is in the form of a doublet and includes a plano-convexly curved birefringent lens element 18 and a plano-concavely curved birefringent lens element 20. The lens element 18, in turn, has a plano surface 21 and a spherically curved convex surface 22 while the lens element 20 has a plano surface 24 and a concavely curved surface 26 of like spherical curvature. The concave surface 26 and the convex surface 22 are preferably arranged in nested relation to each other and these curved surfaces may be cemented together if desired. Either plano surface 21 or 24 may face the target.

In a preferred form, the birefringent lens elements 18 and 20 may be made of crystalline quartz, which material has indices of refraction of 1.544 and 1.553 for the ordinary and extraordinary rays thereof respectively.

(Other crystalline materials which may be used are calcite with $N_O = 1.658$ and $N_E = 1.486$ or tourmaline with $N_O = 1.669$ and $N_E = 1.638$.) With the optic axes of the two birefringent lens elements 18 and 20 arranged parallel to their respective plano surfaces and in crossed relation to each other and with their plano surfaces disposed at right angles to the optical axis 17 of the system, these two elements make a birefringent doublet assembly which splits the light rays passing therethrough, such as indicated by the arrow 30, into two vibrational components polarized in planes at right angles to each other. Furthermore, these two lens elements 18 and 20 together will contribute positive power to one of the transmitted polarized components and negative power for the other.

More specifically, the positive and negative power contributions just mentioned are due to the combination of several conditions. Firstly, a light ray from target 16 in passing through the first birefringent lens element 20 will be split into an ordinary ray and an extraordinary ray which are orthogonally related to each other, and which rays, in turn, while passing through the birefringent crystal travel at different velocities. Additionally, in the second birefringent lens element 18 wherein the optical conditions to be encountered by the light are reversed due to the crossed relation between the optic axes of the crystals, the ordinary ray of the first element becomes the extraordinary ray in the second element and likewise the extraordinary ray in the first element becomes the ordinary ray in the second element. Thus, the fast ray in the first element becomes the slow ray in the second element. These facts, coupled together with the conditions wherein the spherical curvature of one element is concave and that of the other element is convex, will provide the positive and negative power contribution for the transmitted light rays as mentioned above.

If the radius of curvature of the convex and concave surfaces 22 and 26, for example, is about 36 millimeters, one vibrational component of the beam will emerge from the birefringent doublet assembly 12 with about a one-quarter diopter positive power and the other vibrational components with about a one-quarter diopter negative power. Thus, these powers, together, will provide spacing of about one-half of a diopter between the best focus of image provided by one of the vibrational components of the light beam emerging from the doublet 12 and the best focus of image for the other.

The variable power lens assembly 14 of FIG. 1 consists of two refractive lens elements 40 and 42 which are laterally movable with respect to the optical axis 17 and in relation to each other for the purpose of providing various different dioptric powers for the eye refraction system. The lens elements 40 and 42 may be of the type defined in the Alverez U.S. Pat. No. 3,305,294 dated Feb. 21, 1967, and may be used to adjustably provide in a continuously variable manner a range of positive and negative spherical dioptric powers of like values for both polarized beams of the eye refraction system.

As shown, the lens element 40 has a variously curved refractive surface 43 and a plano surface 44, while lens element 42 (which is similar in all respects but arranged in a reversed position) has a plano surface 45 and a variously curved refractive surface 46. By reversed, it is meant that lens element 42 is rotated 180° about the optical axis 17 as compared to lens element 40. When either lens element 40 or 42 is moved from its centered position laterally in relation to the other lens element, as indicated by the arrow 47, spherical prescriptive dioptric power will be added to or subtracted from both of the differently polarized light components coming from the target area and passing therethrough. Or, both of said elements 40 and 42 may be moved in opposite directions simultaneously for the same purpose, if desired.

Such a variable power lens assembly as just described has an advantage in an eye refraction otpical system of the type involving the present invention when the space along the optical axis 17 is limited. On the other hand, lenses of this type may be expensive and difficult to manufacture. The two lens elements 40 and 42 may be placed in suitable mounting frames or the like and arranged so that the patient or the optician may operate suitable control mechanism for effecting movement of one lens element relative to the other. Furthermore, the dioptric power for a particular position of adjustment of the two lens elements may be indicated by the use of a scale and associated pointer or index mark, or even two scales cooperatively secured to the two lens elements and movable with the lens elements may be provided.

In copending application Ser. No. 794,869, filed Jan. 29, 1969 now U.S. Pat. No. 3,617,116, a variable power lens system of slightly different arrangement is disclosed. In this latter arrangement, a pair of lens elements each having plano and variously curved lens surfaces and much like the Alvarez lens, already referred to, are disclosed, but same arranged to be placed with their plano surfaces in contacting relation to each other. Such a condition will allow the lens elements to slide laterally as desired and no air space is required therebetween. In said application, it is pointed out that spherical powers, both positive and negative, can be had by a sliding action along the X—X axis of the structure. Additionally, it is made clear that a sliding action in the 90° direction along the Y—Y axis will provide a cylindrical correction for the assembly. Such has utility in the instant disclosure wherein for Rx purposes both spherical and cylindrical corrections are useful.

Figure 2:
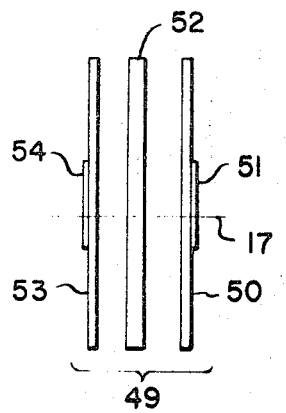
FIG. 2 is a schematic side elevational view of one form of target assembly for use in an optical system embodying the invention, same utilizing two superimposed target areas to be viewed.
Figure 3:
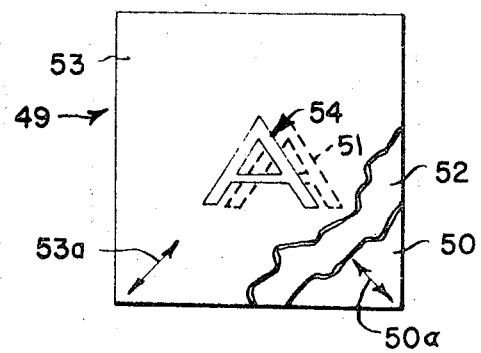
FIG. 3 is a front elevational view of the target assembly of FIG. 2.

As stated above relative to FIG. 1, the target assembly 16 may be provided by two image areas which are partly superimposed or may be provided by a split-field image target in which case the two image areas are presented in adjacent side-by-side relation to each other. The target assembly 49 shown in FIGS. 2 and 3 is of the partly superimposed image type and for convenience may be referred to as being of a vectographic type. A process for producing such a vectographic target as is herein described is explained in detail in an article entitled "New Vectograph Process" by J. Mahler, published in PHOTOGRAPHIC SCIENCE AND ENGINEERING, Volume 7, No. 5, Sept.-Oct. 1963, starting on page 285, but with the exception that the two images provided thereby will be laterally or vertically displaced relative to one another sufficiently to allow the two images to be easily distinguished from each other during use of the apparatus.

Using such a vectographic target with the optical system of FIG. 1 and with the birefringent doublet 12 rotated about the optical axis 17 suitably to function therewith, two different target images will be seen in light beams polarized in directions at right angles to each other and, furthermore, the patient viewing the target will see one of the target images at a slightly different dioptric power than the other. Or stated differently, when one image appears in sharp focus, the other will appear somewhat blurred, and vice versa.

As shown in an expanded condition in FIG. 2, and in exaggerated thicknesses for purposes of illustration, the target assembly 49 may include a molecularly oriented polyvinyl alcohol sheet 50 on which is imprinted an iodide-iodine dye image 51. This film is anchored to and supported by a cellulose acetate butyrate backing sheet 52. On the other side of the backing sheet 52 is anchored a molecularly oriented polyvinyl alcohol sheet 53, which is similarly imprinted with an iodide-iodine dye image 54. The two sheets 50 and 53 are secured to the backing sheet with their images 51 and 54 suitably offset from each other, and with their directions of molecular orientation, as indicated by arrows 50a and 53a, in perpendicular relation to each other.

This form of vectograph may be used as a transparency or, with a light-diffusing non-depolarizing reflective backing, not shown, as a reflective type of printed target. Nevertheless, when viewing through the optical system of FIG. 1 while using one eye only, the patient will simultaneously see two co-planar target images, one of which will be seen slightly out of focus if the other is in focus. By manipulating the variable power lens assembly 14, the patient or the doctor may readily adjust for equal sharpness of the two target images if desired, or for the best sharpness of image of one of these target images while the other is out of focus. Nevertheless, the patient will be viewing both of the images simultaneously.

Figure 4:
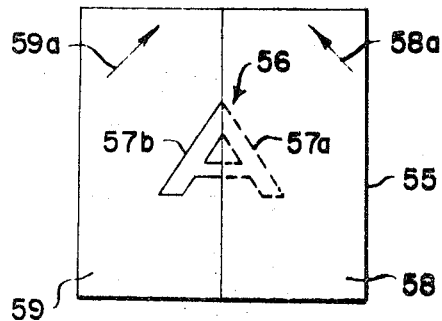
FIG. 4 is a front elevational view of a modified form of target assembly for use in an optical system embodying the present invention, said assembly being of a split-field type providing two target areas in side-by-side relation to each other.
Figure 5:
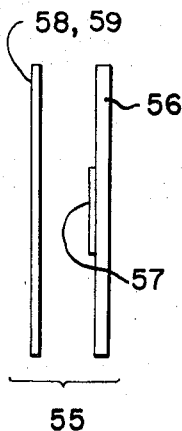
FIG. 5 is a schematic side elevational view of the target assembly of FIG. 4.

As illustrated in FIGS. 4 and 5, a different kind of target assembly which can be used at 16 in FIG. 1 is disclosed at 55. This target assembly comprises a transparent backing sheet 56 which has a target image, such as a resolution chart or the like, 57 imprinted thereon. A pair of side-by-side orthogonally related polarizing sheets 58 and 59 are employed in front of the sheet 56 for splitting a target image such as the letter "A" into half images 57a and 57b. These polarizing sheets lie in the same plane and are in adjacent side-by-side relation to each other but have their planes of polarization, as indicated by arrows 58a and 59a, oriented at 90° to each other. Each polarizing sheet may be made of molecularly oriented polyvinyl chloride alcohol film mounted on suitable transparent backing material as is well known in the art.

Thus, the patient viewing a split-target of the type of FIGS. 4 and 5 through the optical system of FIG. 1, and with th optic axes of the birefringent elements of doublet 12 suitably oriented relative to the polarization planes of the polarizing sheets 58 and 59, will see one part of the image 57a slightly out of focus when the other half image 57b is in focus. Thus, the patient may, while the patient or the doctor is manipulating the variable power lens assembly, view the split image for sharpness of the two half images and choose therebetween. Or, he may manipulate the adjustments for equal sharpness of the two images. At this point of equal sharpness, the adjustment should be straddling th optimum prescriptive correction for the eye being tested, and a reading on the scale of the variable power lens assembly 14 should show the refractive error to be cared for.

Figure 6:
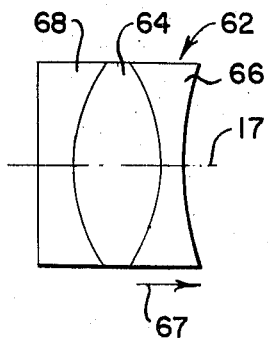
FIG. 6 is a schematic side elevational view of a modified form of structure for use in the optical system embodying the invention.

A modified form of eye refraction optical system may be obtained by the use of a variable power lens assembly of the type shown at 62 in FIG. 6 in place of the variable power lens assembly 14 of FIG. 1. As shown, the assembly 62 uses a three lens combination having a central doubly convexly spherically curved lens element 64 and at its opposite sides a pair of negative lens elements 66 and 68. These parts, as shown, are in optical alignment and nested relation to each other. In such position, the three elements together act as a strongly negative component of whatever maximum negative dioptric power is needed for the eye refraction optical system. However, the combination 68 and 64 should provide a net positive power. When element 66 which is negative, is moved axially away from 64 and 68, as indicated by arrow 67, positive power will be added to both polarized beams of the optical system. Thus, when the negative element is moved axially sufficiently a zero power will be reached and when moved even greater amounts positive powers will be provided for the optical system. Thus, a range of positive and negative prescriptive dioptric powers as well as zero power may be provided. For instance, with the three lens elements having the following dioptric powers: 68, −10 Diopters; 64, +20 Diopters; and 66, −20 Diopters, one finds that a range of total power from −10 Diopters to +10 Diopters can be obtained with a total movement of element 66 of 150 millimeters.

The three lens combination of FIG. 6 has an advantage over the more complex variable power lens system 12 of FIG. 1 in that it may be less expensive to manufacture. Also, it will perform nicely in a system wherein space along the optical axis for adjustment of the separate elements is not limited. Additionally, a lens system of this type may be manufactured by conventional lens-making equipment.

Figure 7:
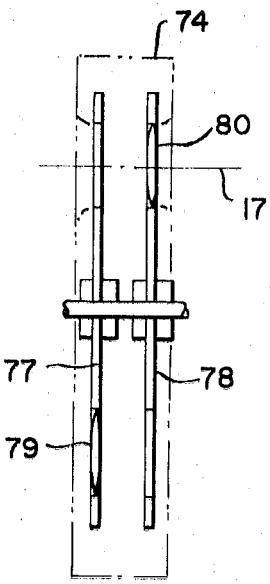
FIG. 7 is a schematic side elevational view of another modified form of structure for use in the optical system embodying the invention.

A different form of variable power lens assembly which may be used advantageously in the eye refraction system of FIG. 1 in place of the assembly 14 is shown at 74 in FIG. 7. It may include a variable power lens structure equivalent to that of a conventional eye refracting instrument of the type referred to as a Phoroptor. Such a device is disclosed in U. S. Pat. No. 2,322,877 issued June 29, 1943. While this instrument uses two cells for binocular refraction, nevertheless, in the instant invention, only one such cell for refracting one eye only would be required. Such a cell is suggested by the dotted lines 74 and would comprise one or a pair of rotatable discs, such as indicated at 77 and 78 for inserting lenses of different known powers into the optical axis 17. When this is the case, spherical lenses, such as at 79, both positive and negative powers and/or cylindrical lenses of positive powers, such as at 80, may be easily and accurately located in the refracting system for viewing from the eye position 11.

With this arrangement, a view of two target images either partially superimposed and of slightly different dioptric powers or a view of two target images in a split-field arrangement in side-by-side relation but at slightly different dioptric powers can be had depending upon which target assembly is used. Once again, the patient will see two images at the same time and may choose the one of the sharpest focus, or select a condition wherein the two image focuses are of equal sharpness. This arrangement has the advantage that lenses in discrete dioptric steps may be quickly and successively inserted into optical alignment and both spheres and cylinders used in various combinations and changed easily one for another while the patient is viewing the two images.

Figure 8:
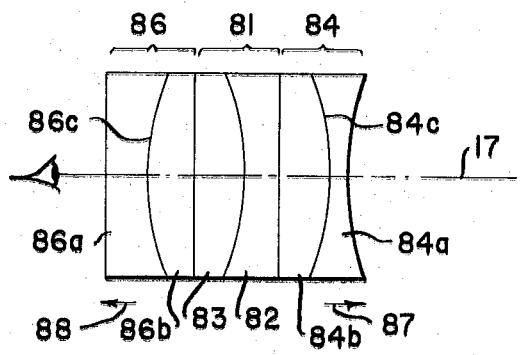
FIG. 8 is a schematic side elevational view of still another modified form of structure for use in the optical system embodying the invention.

A further modified form of the invention is suggested in FIG. 8 wherein a nested birefringent and variable power lens combination is shown. A doublet is employed at 81 and includes a pair of crossed birefringent lens elements 82 and 83, and at the opposite sides of this doublet, a pair of doublets 84 and 86 of conventional kind are used. The doublet 84 includes refracting lens elements 84a and 84b while the doublet 86 includes refractive lens elements 86a and 86b. However, it should be noted that the combination as a whole provides a negative dioptric power, and when, as indicated by arrows 87 and 88, axial movement of lens element 84a or 86a is performed positive dioptric power will be added to the target image light being transmitted through the system so that zero power may be had but further axial adjustment of the element 84a or 86a will provide positive dioptric power to the target image light being transmitted through the system. The FIG. 8 arrangement has an advantage in that all surfaces are either spherical or plano and thus can be made easily by conventional optical lens-forming equipment.

In further considering the structure described above, it should be appreciated that, while the birefringent doublet 12 of FIG. 1 may be, at times, preferred, it is possible to have one lens element of such a doublet made of conventional glass while the other is still made of birefringent material. In such a modified birefringent doublet, the conventional lens element of glass preferably has a refractive index substantially like the refractive index for the ordinary or the extraordinary rays provided by birefringent lens element of the combination. When such a modified doublet employing only one birefringent lens element is properly oriented in the eye refraction system of FIG. 1, it will split the light rays being transmitted therethrough and will provide two different images for simultaneous viewing by the patient being refracted. However, in such a case, the difference in dioptric power provided by the two-image beam is only half as great as that provided by assembly 12. Such an arrangement using a doublet having only one birefringent lens element is within the inventive concept of the present invention.

Figure 9:
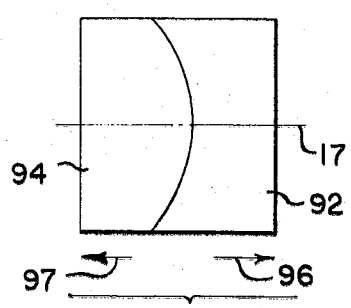
FIG. 9 is a side elevational view of a refracting doublet of special kind for use in the optical system embodying the invention.

When using the birefringent and variable power lens means of FIG. 6, or FIG. 8, only spherical powers can be added or subtracted to alter the two target images of slightly different powers being viewed by the patient. It is possible, nevertheless, to also use with either of these systems a doublet refracting lens arrangement like that shown at 90 in FIG. 9 wherein a plano-concavely cylindrical lens element 92 is provided in nested relation to a plano-convexly curved cylindrical lens element 94. Axial movement of either element away from the other, as suggested by arrows 96 and 97 will add positive cylindrical power of like values to both of the target images being viewed. Such is useful when correcting astigmatic errors of an eye. Proper axis for this correction can be determined by rotation of this doublet as a unit about the optical axis 17.

What is claimed is:

1. An eye refraction optical system comprising birefringent and continuously variable power lens means and a resolution target disposed in spaced relation to each other along a common optical axis, said resolution target being of such known kind as to direct two different beams of orthogonally related polarized light along a path including said optical axis toward said lens means and an eye refraction position of said system, said birefringent and variable power lens means being of such construction and arrangement as to allow two different images of said target as provided by said two differently polarized beams of light to be viewed simultaneously therethrough from said eye refraction position, said birefringent and variable power lens means including a pair of nested plano-spherically curved birefringent lens elements forming a plano faced doublet, the plano faces thereof being oriented essentially orthogonal to the system optical axis, the optic axes of the pair of birefringent lens elements being disposed essentially orthogonal to each other and in a plane essentially orthogonal to the system optical axis, the optic axes being further oriented with respective ones of the two different beams of orthogonally related polarized light from said resolution target, the pair of nested birefringent lens elements serving to provide a slightly different predetermined amount of dioptric power in the polarized light in one of said beams in comparison to that provided the polarized light of the other of said beams, said birefringent and variable power lens means also including at least one refractive lens element which is so movable in such system and of such optical characteristics as to allow one of said images of said target to be viewed from said eye position at a selected dioptric power while the other of said images is simultaneously viewed at a slightly different dioptric power, the difference therebetween being provided by said pair of birefringent lens elements, whereby comparison of said images and selection of image of best focus may be readily accomplished.

2. The combination defined in claim 1 and wherein said birefringent and variable power lens means includes two birefringent lens elements having their respective optic axes disposed in orthogonal relation to each other and in perpendicular relation to said common optical axis, said two birefringent lens elements providing equal amounts of dioptric power but of opposite sign to said two beams of polarized light being transmitted through the optical system from said resolution target to the eye refraction position thereof.

3. The combination defined in claim 1 and wherein said birefringent and variable power lens means includes at least two refractive lens elements which are adjustable relative to each other.

4. An optical system according to claim 1 and wherein said target includes two fields in side-by-side relation to each other and each is arranged to provide polarized light having its plane of polarization in crossed relation to the plane of polarization of the other.

5. An optical system according to claim 1 and wherein said target provides two fields in superimposed relation to each other and each provides polarized light vibrating in a plane disposed in crossed relation to the plane of vibration of the other.

6. An optical system according to claim 1 and wherein cylindrically curved refractive lens means is provided in said system for providing a measurement of the astigmatic error of a patient's eye.

7. An optical system according to claim 4 and wherein two sheets of polarizing material are mounted in side-by-side relation to each other in front of a resolution chart to form a target and with the planes of polarization thereof at 90° relative to each other.

8. An optical system according to claim 1 and wherein said system includes refractive lens means having at least a pair of related lenses which are laterally movable relative to each other in two different directions for providing both spherical and cylindrical variable dioptric powers of equal amounts to both of the images being simultaneously viewed through said system.

9. An optical system according to claim 1 and wherein said system includes a pair of nested plano-spherically curved lens elements one of which is moved axially relative to each other for providing continuously variable amounts of spherical dioptric power to the two different beams being viewed simultaneously through said system and at least one pair of nested plano-cylindrically curved lens elements one of which is movable axially relative to the other for providing continuously variable amounts of cylindrical power to said two different beams.

10. The combination defined in claim 1 and wherein said birefringent and continuously variable power lens means includes at least one pair of nested plano-spherically curved lens elements having spherically curved nested refractive surfaces thereon, the lens elements being movable axially relative to each other for providing continuously variable amounts of spherical dioptric power to the two different beams being viewed simultaneously through said system and at least one pair of plano-cylindrically curved lens elements one of which is movable axially relative to the other for providing continuously variable amounts of cylindrical dioptric power to said two different beams.

* * * * *